US012184584B2

(12) United States Patent
Miranda (10) Patent No.: US 12,184,584 B2
(45) Date of Patent: Dec. 31, 2024

(54) METHODS AND SYSTEMS FOR ADAPTING CELLULAR DOWNLINK CHANNELS OPERATING IN THE PRESENCE OF NON-STATIONARY INTERFERENCE

(71) Applicant: GOGO BUSINESS AVIATION LLC, Broomfield, CO (US)

(72) Inventor: Heinz A. Miranda, Cary, IL (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 248 days.

(21) Appl. No.: 17/592,661

(22) Filed: Feb. 4, 2022

(65) Prior Publication Data
US 2023/0254090 A1    Aug. 10, 2023

(51) Int. Cl.
*H04L 5/00*        (2006.01)
*H04B 1/713*       (2011.01)
(Continued)

(52) U.S. Cl.
CPC ........... *H04L 5/0055* (2013.01); *H04B 1/713* (2013.01); *H04L 5/0057* (2013.01); *H04W 48/12* (2013.01); *H04W 72/543* (2023.01); *H04L 1/203* (2013.01)

(58) Field of Classification Search
CPC ..... H04B 1/713; H04L 1/0003; H04L 1/0026; H04L 1/0035; H04L 1/203; H04L 5/0055;
(Continued)

(56) References Cited

U.S. PATENT DOCUMENTS 9,319,928 B2    4/2016  Bertrand et al.
2005/0278609 A1*  12/2005  Kim ...................... H04L 25/067
                                          714/780
(Continued)

FOREIGN PATENT DOCUMENTS

EP          1 783 943 A1    5/2007
WO      WO-2017/041207 A1   3/2017
(Continued)

OTHER PUBLICATIONS

Park et al., "Optimizing the Target Error Rate for Link Adaptation", 2015 IEEE Global Communications Conference (GlobeCom), Dec. 6-10, 2015, 6 pages.
(Continued)

*Primary Examiner* — Shah M Rahman
(74) *Attorney, Agent, or Firm* — MARSHALL, GERSTEIN & BORUN LLP; Randall G. Rueth (57) ABSTRACT

Example methods and systems for adapting fourth generation (4G) and/or fifth generation (5G) cellular downlink channels in the presence of non-stationary interference are disclosed. An example method, implemented by one or more processors of a cellular base station, includes: receiving, from a user equipment (UE) radio, channel state information (CSI) for a cellular downlink channel between the cellular base station and the UE; determining a signal to interference and noise ratio (SINR) offset based upon the CSI, and a target block error rate (BLER); determining a variance of the SINR offset that represents one or more characteristics of the non-stationary interference; and determining the target BLER based upon the variance of the SINR offset such that the cellular downlink channel adapts to the presence of the non-stationary interference.

22 Claims, 5 Drawing Sheets

(51) Int. Cl.
*H04W 48/12* (2009.01)
*H04W 72/543* (2023.01)
*H04L 1/20* (2006.01)

(58) Field of Classification Search
CPC .... H04L 5/0057; H04W 48/12; H04W 72/543
See application file for complete search history.

(56) References Cited

U.S. PATENT DOCUMENTS

| | | | |
|---|---|---|---|
| 2009/0034425 A1 | 2/2009 | Jansson et al. | |
| 2013/0322276 A1* | 12/2013 | Pelletier | H04W 24/10 370/252 |
| 2015/0264704 A1* | 9/2015 | Park | H04W 72/542 370/329 |
| 2017/0013609 A1* | 1/2017 | Kim | H04L 5/0053 |
| 2018/0054744 A1* | 2/2018 | Smith | H04B 7/0695 |
| 2019/0036829 A1 | 1/2019 | Ji et al. | |
| 2019/0349789 A1* | 11/2019 | Zeng | H04L 1/0003 |
| 2020/0366448 A1* | 11/2020 | Papasakellariou | H04L 5/006 |
| 2020/0383102 A1* | 12/2020 | Yamaguchi | H04W 72/044 |
| 2021/0036804 A1* | 2/2021 | Zhu | H04W 72/542 |
| 2021/0160780 A1* | 5/2021 | Liu | H04W 72/23 |
| 2022/0069939 A1* | 3/2022 | Marsan | H04L 1/0026 |
| 2022/0256519 A1* | 8/2022 | Jeon | G01S 7/42 |
| 2022/0408445 A1* | 12/2022 | Sun | H04W 72/54 |
| 2023/0097142 A1* | 3/2023 | Alfarhan | H04L 5/0051 370/329 |
| 2023/0189315 A1* | 6/2023 | Haustein | H04W 24/02 370/252 |
| 2023/0246751 A1* | 8/2023 | Jamal | H04L 1/203 714/704 |
| 2024/0098773 A1* | 3/2024 | Soldati | H04L 1/0023 |

FOREIGN PATENT DOCUMENTS

| | | |
|---|---|---|
| WO | WO-2017/164783 A1 | 9/2017 |
| WO | WO-2018/070910 A1 | 4/2018 |
| WO | WO-2018064551 A1 * | 4/2018 |
| WO | WO-2021/123494 A1 | 6/2021 |
| WO | WO-2023274522 A1 * | 1/2023 |

OTHER PUBLICATIONS

International Application No. PCT/US2023/011437, International Search Report and Written Opinion, mailed Apr. 25, 2023.

* cited by examiner

METHODS AND SYSTEMS FOR ADAPTING CELLULAR DOWNLINK CHANNELS OPERATING IN THE PRESENCE OF NON-STATIONARY INTERFERENCE

FIELD OF THE DISCLOSURE

The present disclosure generally relates to fourth generation (4G) and fifth-generation (5G) communication systems, and, in particular, to methods and systems for adapting 4G and/or 5G cellular downlink channels operating in the presence of non-stationary interference.

BACKGROUND

A 4G and/or 5G base station controls the block error rate (BLER) for a cellular downlink channel using (i) inner loop link adaptation (ILLA) to select a modulation and coding scheme (MCS) based upon link quality measurements reported by a user equipment (UE), and (ii) outer loop link adaptation (OLLA) to adjust the required link quality based upon an actual BLER and a target BLER.

SUMMARY

In an embodiment, a method implemented by one or more processors of a cellular base station includes: receiving, from a user equipment (UE) radio, channel state information (CSI) for a cellular downlink channel between the cellular base station and the UE; determining a signal to interference and noise ratio (SINR) offset based upon the CSI, and a target block error rate (BLER); determining a variance of the SINR offset that represents one or more characteristics of the non-stationary interference; and determining the target BLER based upon the variance of the SINR offset such that the cellular downlink channel adapts to the presence of the non-stationary interference.

In a variation of this embodiment, the target BLER is determined by comparing the variance of the SINR to one or more thresholds.

In a variation of this embodiment, the target BLER is selected from two or more pre-determined target BLER values using a state machine having two or more states corresponding to the two or more predetermined target BLER values, where transitions between states are based upon comparisons of the variance of the SINR to a plurality of pre-determined thresholds.

In a variation of this embodiment, the method further comprises: when the variance of the SINR satisfies a first pre-determined threshold of the plurality of pre-determined thresholds, changing from (i) a first state in which the target BLER is set a first pre-determined target BLER value to (ii) a second state in which the target BLER is set to a second, larger pre-determined target BLER value; and when the variance of the SINR satisfies a second pre-determined threshold of the plurality of pre-determined thresholds, changing from the second state to the first state.

In a variation of this embodiment, the first pre-determined threshold is larger than the second pre-determined threshold.

In a variation of this embodiment, the target BLER is determined to reduce the variance of the SINR.

In a variation of this embodiment, the non-stationary interference is caused by one or more bursty, frequency-hopping transmissions in a frequency band used by the cellular base station and the UE for the cellular downlink channel.

In a variation of this embodiment, the frequency band is a 2.4 GHz frequency band, and the transmissions are caused by a plurality of devices operating within a vicinity of the UE.

In a variation of this embodiment, the plurality of the devices and the UE are operating within an aircraft.

In a variation of this embodiment, the method further comprises: receiving, from the UE radio, acknowledge/not acknowledge (ACK/NACK) indications for the cellular downlink channel; determining the estimated SINR based upon the CSI; and determining the SINR offset based upon the estimated SINR, the ACK/NACK indications, and the target BLER.

In a variation of this embodiment, the method further comprises: selecting a modulation and coding scheme (MCS) for the cellular downlink channel based upon the SINR offset; and sending the selected MCS to the UE radio for the cellular downlink channel.

In a variation of this embodiment, the cellular base station comprises a fourth generation (4G) base station and/or a fifth generation (5G) base station.

In another embodiment, a cellular base station includes: a communication interface configured to receive, from a user equipment (UE) radio, channel state information (CSI) for a cellular downlink channel between the cellular base station and the UE; an outer loop link adaptation module configured to determine, using one or more processors, a signal to interference and noise ratio (SINR) offset based upon the CSI, and a target block error rate (BLER); and a target BLER determination module configured to, using one or more processors: determine a variance of the SINR offset that represents one or more characteristics of the non-stationary interference, and determine the target BLER based upon the variance of the SINR offset such that the cellular downlink channel adapts to the presence of the non-stationary interference.

In a variation of this embodiment, the target BLER determination module is configured to determine the target BLER by comparing the variance of the SINR to one or more thresholds.

In a variation of this embodiment, the target BLER determination module is configured to select the target BLER from two or more pre-determined target BLER values using a state machine having two or more states corresponding to the two or more predetermined target BLER values, where transitions between states are based upon comparisons of the variance of the SINR to a plurality of pre-determined thresholds.

In a variation of this embodiment, the target BLER determination module is configured to: when the variance of the SINR satisfies a first pre-determined threshold of the plurality of pre-determined thresholds, change from (i) a first state in which the target BLER is set a first pre-determined target BLER value to (ii) a second state in which the target BLER is set to a second, larger pre-determined target BLER value; and, when the variance of the SINR satisfies a second pre-determined threshold of the plurality of pre-determined thresholds, change from the second state to the first state.

In a variation of this embodiment, the first pre-determined threshold is larger than the second pre-determined threshold.

In a variation of this embodiment, the cellular base station comprises a fourth generation (4G) base station and/or a fifth generation (5G) base station.

In yet another embodiment, a non-transitory, computer-readable storage medium stores instructions that, when executed by one or more processors, cause a cellular base station to: receive, from a user equipment (UE) radio, channel state information (CSI) for a cellular downlink channel between the cellular base station and the UE; determine a signal to interference and noise ratio (SINR) offset based upon the CSI, and a target block error rate (BLER); determine a variance of the SINR offset that represents one or more characteristics of the non-stationary interference; and determine the target BLER based upon the variance of the SINR offset such that the cellular downlink channel adapts to the presence of the non-stationary interference.

In a variation of this embodiment, the instructions, when executed by one or more processors, cause the cellular base station to determine the target BLER by comparing the variance of the SINR to one or more thresholds.

In a variation of this embodiment, the instructions, when executed by one or more processors, cause the cellular base station to select the target BLER from two or more pre-determined target BLER values using a state machine having two or more states corresponding to the two or more predetermined target BLER values, where transitions between states are based upon comparisons of the variance of the SINR to a plurality of pre-determined thresholds.

In a variation of this embodiment, the instructions, when executed by one or more processors, cause the cellular base station to: when the variance of the SINR satisfies a first pre-determined threshold of the plurality of pre-determined thresholds, change from (i) a first state in which the target BLER is set a first pre-determined target BLER value to (ii) a second state in which the target BLER is set to a second, larger pre-determined target BLER value; and, when the variance of the SINR satisfies a second pre-determined threshold of the plurality of pre-determined thresholds, change from the second state to the first state.

In a variation of this embodiment, the cellular base station comprises a fourth generation (4G) base station and/or a fifth generation (5G) base station

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In fourth generation (4G) and fifth generation (5G) communications systems, outer loop link adaptation (OLLA) compensates for (i) differences between the simulation channel models used to derive the required signal to interference plus noise (SINR) for each modulation and coding scheme (MCS) and an actual channel that a user equipment (UE) is experiencing, (ii) inaccuracies in channel state estimation, and/or (iii) delays in the providing of link quality measurements. Conventionally, channel sounding, channel estimation, and equalization algorithms are designed and optimized for the fading models a UE is typically expected to face. As such, an SINR offset determined by the OLLA and used by inner loop link adaption (ILLA) to select an MCS is expected to have a systematic component that has a relatively constant mean, and a random component that has a zero mean, such that the variance of the SINR offset is relatively small when the actual block error rate (BLER) tracks a target BLER.

However, when a 4G or 5G communication system operates in, for example, the unlicensed 2.4 GHz spectrum, the communication system may encounter non-stationary interference that changes in time and/or frequency. Example devices that may cause non-stationary interference in the unlicensed 2.4 GHz spectrum include WiFi devices (e.g., according to the IEEE 802.11x family of standards), and Bluetooth® devices. While WiFi devices can be configured to operate in other bands (e.g., the 5 GHz spectrum) to obviate their interference, the use of Bluetooth devices is becoming increasingly prevalent and, in some circumstances, can't be sufficiently isolated from 4G and 5G communications. For example, audio streaming over Bluetooth can use what is commonly referred as Bluetooth classic, which transmits using 1 MHz wide channels whose center frequency changes 1600 times per second. That is, non-stationary interference can be caused by one or more bursty, frequency-hopping transmissions in a frequency band used a cellular downlink channel. This effectively causes interference in the form of narrow-band power bursts centered at different frequencies with inter-arrival times anywhere from 50 milliseconds to 10 milliseconds depending on how much bandwidth overlap there is between the spectrum allocated to the communication system, and the bandwidth used by Bluetooth communications.

Given the random nature of such interference in time and/or frequency, conventional BLER control may be unable to provide a consistent BLER. Not consistently achieving a target BLER results in ILLA not consistently selecting the appropriate MCS. This happens because whenever Bluetooth interference occurs, packet errors cause the MCS selection to be too conservative, and then it takes a long time for ILLA to select the appropriate MCS. However, by the time a suitable MCS is selected, another interference burst may occur and the problem repeats. A solution is to increase the target BLER such that the MCS is selected more aggressively, and let Hybrid-ARQ (HARQ) retransmissions recover the errors caused by Bluetooth interference.

When a UE is implemented in a vehicle, such as aircraft, boat, car, bus, train, or the like, the impact of devices, such as Bluetooth devices, on BLER depends on the amount of isolation between the devices and an antenna of the UE. For an aircraft, the UE antenna is typically mounted on the fuselage of the aircraft, such that the fuselage may provide isolation between the UE antenna and interfering devices. However, cabin isolation is typically low for small aircrafts, and higher for large aircrafts. This means that for very large aircraft, the impact of Bluetooth interference could be negligible, while for small aircrafts the interference from Bluetooth devices could be significant.

Another factor that affects the impact of Bluetooth interference on 4G and 5G communications is the selected MCS. For transmissions using low MCSs (e.g., high coding gain), the Bluetooth interference may not cause a block error. However, transmissions with high MCS (e.g., low coding gain) may experience block errors. The current industry approach is to have the same BLER across a network or sector is not appropriate when non-stationary noise is present. While for large aircraft a target BLER of 10% can be effective in combatting non-stationary interference, it can cause lower throughput due to aggressive MCS selection. For small aircrafts, a target BLER of 20% may be required such that more reliance is placed on HARQ retransmissions to compensate for an overly aggressive MCS, but also causes lower throughput.

In the face of such non-stationary interference, it has been advantageously discovered that the variance of the SINR offset determined by OLLA represents whether and/or how often a target BLER is being met. Specifically, a larger SINR offset variance reflects that the target BLER is not consistently being met, while a smaller SINR offset variance reflects that the target BLER is more consistently being met. Thus, to overcome these and other problems of conventional 4G and/or 5G communication systems in the presence of non-stationary interference, disclosed examples dynamically modify the target BLER used to adapt a cellular downlink channel based upon the variance of the SINR offset. Modifying the target BLER in this way increases overall spectral efficiency and throughput by (i) setting a lower target BLER value when non-stationary interference is not present (e.g., when the SINR offset variance is smaller), and (2) setting a larger target BLER value when non-stationary interference prevents conventional BLER control from converging to a target BLER (e.g., when the SINR offset variance is larger). It has been demonstrated that use of a higher target BLER (e.g., 20%) in the presence of aggressive Bluetooth interferers (e.g., with 10 ms inter-arrival rates) that cause a large SINR offset variance increases the overall throughput of the communication system as compared to use of a lower target BLER, even though the higher target BLER causes an increase in coding redundancy.

For simplicity and clarity of explanation, the following description refers to an example 5G communication system, an example 5G base station (gNB), an aircraft, and the adaptation of 5G cellular downlink channels for a UE operating on the aircraft, and operating in the presence of non-stationary interference caused by Bluetooth devices on the aircraft. The aircraft may be a personal, business, or commercial passenger aircraft owned or leased by an individual, business, airline company, or the like. However, one of ordinary skill in the art will recognize that embodiments disclosed herein can also be used by a 4G base station and/or, more generally, in a 4G communication system to adapt 4G cellular downlink channels for a UE operating in the presence of non-stationary interference. Moreover, one of ordinary skill in the art will recognize that embodiments disclosed herein can also be used by future base stations and/or, more generally, in future communication systems to adapt their cellular downlink channels for a UE operating in the presence of non-stationary interference. One of ordinary skill in the art will further recognize that embodiments disclosed herein can also be used to adapt 4G, 5G, and/or any other variety of cellular downlink channels for any type(s) of UEs operating on any type(s) of vehicle (e.g., an airplane, ship, train, bus, etc.), and in the presence of any number and/or type(s) of interfering devices. A vehicle may be configured for travel by land, sea, air, or some combination thereof. Generally speaking, a vehicle is any machine capable of conveying cargo and/or passengers from one location to another. A vehicle may be used to transport passengers who pay for, or are otherwise granted, passage on the vehicle. The owner and/or operator of a vehicle may be an individual or some other entity, such as a business entity or governmental entity. In some embodiments, a vehicle may be one of a fleet of vehicles and/or may be used to transport live or inanimate cargo, packages, mail, and/or other types of passengers or cargo.

Reference will now be made in detail to non-limiting examples, some of which are illustrated in the accompanying drawings.

Example 5G Communication System

Figure 1:
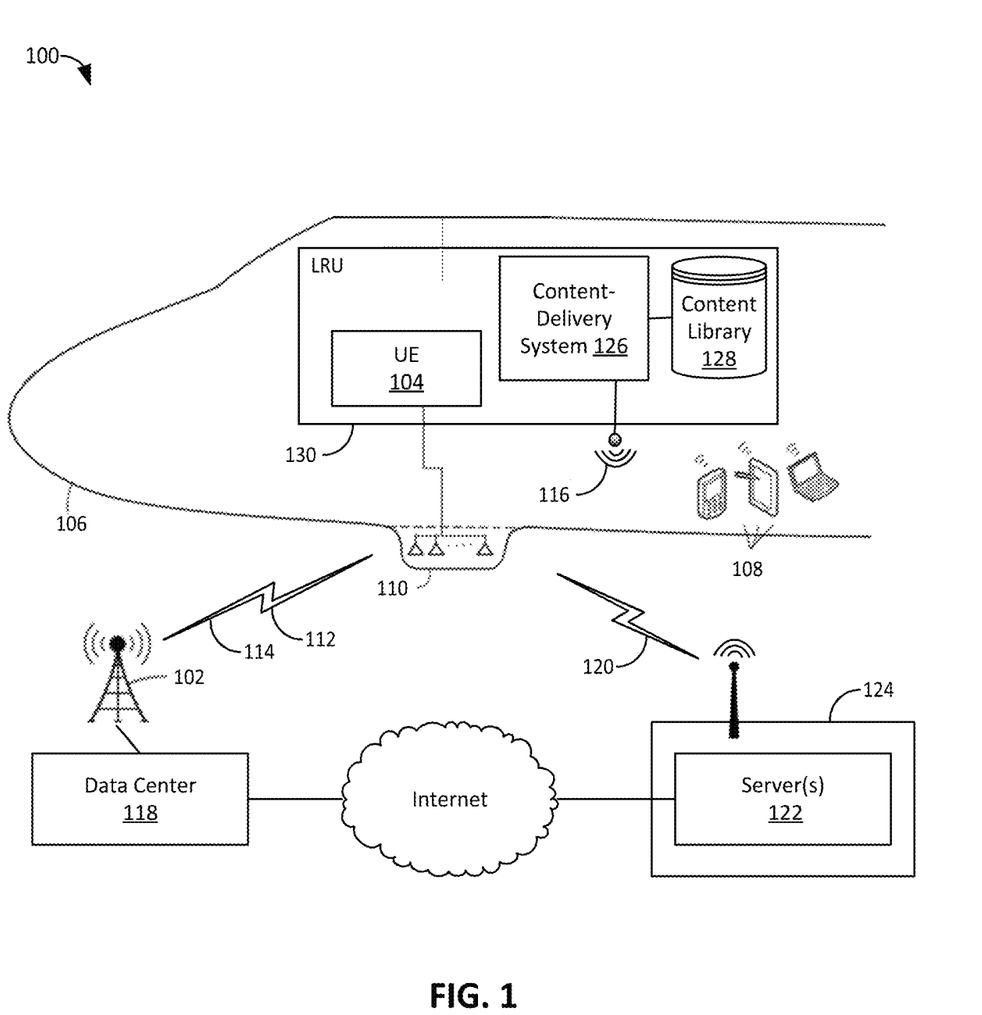
FIG. 1 is a block diagram of an example system having an example 5G base station (gNB) for adapting 5G cellular downlink channels in the presence of non-stationary interference, in accordance with the disclosure.

FIG. 1 illustrates an example 5G communication system 100 having one or more example gNBs 102, according to an embodiment, for adaptation of 5G cellular downlink channels between the gNB 102 and one or more example UEs 104 that are operating on a vehicle, which can be an aircraft 106, as disclosed herein. The UE(s) 104 may be operating in the presence of non-stationary interference caused by, for example, one or more electronic devices 108 on the aircraft 106. The UE(s) 104 are coupled to at least one respective antenna 110, and are configured to exchange data with the gNBs 102 via the antenna(s) 110 over one or more 5G air-to-ground (ATG) cellular communication links 112. The example gNB(s) 102 adapt cellular downlink channels 114 of the cellular communication link 112 to mitigate non-stationary interference caused by the devices 108, e.g., Bluetooth devices, in proximity to the UE 104.

Example electronic devices 108 include any computing device, such as a smartphone, a tablet, a laptop computer, a personal digital assistant, an e-reader, smart glasses, a smart watch, a head set, headphones, or any other computing device. One or more of the electronic devices 108 may be Bluetooth devices.

As shown, the aircraft 106 may be associated with one or more communication networks and/or links. For example, (i) a communication network 116 to provide communication services to the electronic devices 108 while the electronic devices 108 are disposed within the aircraft 106, (ii) the cellular communication link(s) 112 between the UE(s) 104 and the gNB(s) 102, which can be connected to a data center 118, and (iii) a communication link 120 between the aircraft 106 and systems or servers 122 at an FBO's facility 124 while the aircraft 106 is at the FBO's facility 124. The electronics devices 108 can communicate with other systems via one or more of the network 116, and the link(s) 112 and 120.

Generally speaking, the communication network 116 is a network or group of networks disposed, managed, and/or hosted on-board the aircraft 106. The network 116 can include various nodes and links used for data and/or communication exchange between the nodes. In an embodiment, nodes of the network 116 can also communicate with nodes outside of the network 116 (via, e.g., the links 112, 120). The network 116 can include one or more of: a wired network, a wireless network, or a network that uses a combination of wired and wireless technology. Further, the network 116 can include a public or a private network.

In an embodiment, the network 116 includes one or more access points that allow some or all of the electronic devices 108 to connect to the network 116. For example, the network 116 can include networking equipment such as routers, hubs, switches, repeaters, bridges, and/or gateway devices. Some of the networking equipment may utilize a spread spectrum paradigm and/or one or more RF bands (e.g., an ISM band, such as the 900 MHZ band, 2.4 GHz band or 5 GHz band) to facilitate communication.

The aircraft 106 can include a content-delivery system 126 configured to, among other things, deliver content from an onboard content library 128 or a remote content library to the electronic devices 108 via the communication network 116. The content-delivery system 126 can deliver content to the electronic devices 108 regardless of its connection to an external network, such as the Internet. The UE 104, the content-delivery system 126, and the content library 128 can be implemented within a line replaceable unit (LRU) 130, in some examples. Typically, an LRU is an electronic assembly that performs a specific function in the aircraft 106, can be removed or replaced as a unit, and can be serviced at a vehicle maintenance center.

While not shown in FIG. 1 for clarity of illustration, the aircraft 106 can include electronic systems such as avionics systems (or equivalents for non-aircraft vehicles), such as communication systems, navigation systems, instrumentation, flight-control systems, or collision avoidance systems. The electronics system can also include non-avionics systems (e.g., electronics not specifically designed for use in an aircraft) such as control systems, data distribution devices, etc. As many of the electronics systems may require a degree of stability and/or secure attachment during transportation, at least some of the electronics systems can be included in an LRU that is fixedly or rigidly attached to the aircraft 106. Some of the electronics systems may not be included in LRUs. For example, instead of being fixedly connected to the aircraft 106 via LRUs, some electronics systems can be fixedly connected to the aircraft 106 using some other means, such as a bracket or other connecting device.

The gNB 102 adapts the cellular downlink channel 114 of the cellular communication link 112 to mitigate non-stationary interference caused by devices 108, e.g., Bluetooth devices, in proximity to the UE 104. Based upon channel quality or channel state information provided by the UE 104 for the downlink channel 114, the gNB 102 determines the variance of the SINR offset determined by OLLA, which represents one or more characteristics of the non-stationary interference, and dynamically determines a target BLER for use by OLLA and ILLA to adapt the MCS for the cellular downlink channel 114, such that the cellular downlink channel 114 adapts to the presence of the non-stationary interference. That is, such that an actual BLER converges to the target BLER, and the variance of the SINR offset is reduced. The target BLER can be determined by comparing the variance of the SINR to one or more thresholds, for example. In some examples, the target BLER is selected from two or more pre-determined target BLER values using a state machine having two or more states corresponding to the two or more predetermined target BLER values, where transitions between states are based upon comparisons of the variance of the SINR offset to one or more pre-determined thresholds.

The gNB 102 can determine the SINR offset by receiving, from the UE 104, channel quality or channel state information (CSI) for the cellular downlink channel 114 between the gNB 102 and the UE 104, and determining the SINR offset based upon the CSI, and a target BLER. In more detail, the gNB 102 can receive acknowledge/not acknowledge (ACK/NACK) indications for the cellular downlink channel 114 from the UE 104, determine an estimated SINR based upon CSI, and determine the SINR offset based upon the estimated SINR (which is based upon the CSI), the ACK/NACK indications, and the target BLER.

The gNB 102 can select an MCS for the cellular downlink channel 114 based upon the estimated SINR and the SINR offset, and send the selected MCS to the UE 104 for the cellular downlink channel 114.

Example 5G Base Station (gNB)

Figure 2:
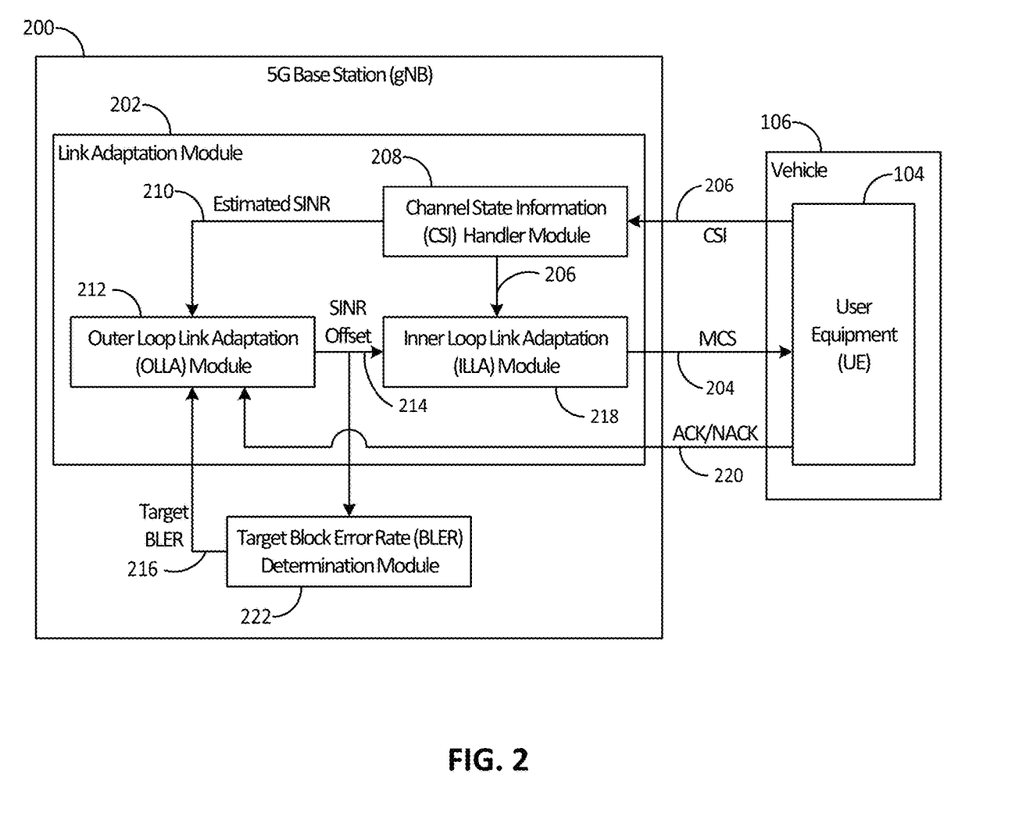
FIG. 2 is a block diagram of an example implementation of the example gNB of FIG. 1, in accordance with the disclosure.

FIG. 2 is a block diagram of an example gNB 200 that can be used to implement the example gNB 102 of FIG. 1. The example gNB 200 includes a 5G link adaptation module 202 configured to adapt the cellular downlink channel 114 by selecting an MCS 204 based upon CSI 206 reported by the UE 104. The link adaptation module 202 includes (i) a CSI handler module 208 to determine an estimated SINR 210 based upon the CSI 206, (ii) an OLLA module 212 to adjust an SINR offset 214 based upon an actual BLER and a target BLER 216, and (iii) an ILLA module 218 configured to select the MCS 204 based upon the CSI 206 and the SINR offset 214, and send the selected MCS 204 to the UE 104 for the cellular downlink channel 114.

An example CSI 206 is a 4-bit channel quality indicator (CQI) for the cellular downlink channel 114 that represents a particular estimated instantaneous SINR determined by the UE 104 for the downlink channel 114. The CSI handler module 208 can determine the estimated SINR 210 by mapping the CQI to an SINR value as the estimated SINR 210 using, for example, a table.

The OLLA module 212 can determine the SINR offset 214 based upon hybrid automatic repeat request (HARQ) acknowledge/not acknowledge (ACK/NACK) indications 220 received from the UE 104 for the cellular downlink channel 114, the estimated SINR 210 (which is based upon the CSI 206), and the target BLER 216. The OLLA module 212 can determine the SINR offset 214 to represent a correction term that is the accumulation of pre-defined fixed up and down steps (i.e., $\Delta^{up}$ and $\Delta^{down}$ respectively) corresponding to HARQ ACKs and NACKs, respectively. A ratio of the step sizes for ACK and NACK represents the BLER target 216 to which the link adaptation module 202 tries to converge, in some examples.

The ILLA module 218 can select an MCS 204 for the cellular downlink channel 114 from a set of pre-determined different modulation schemes based upon the estimated SINR 210 and the SINR offset 214, for example. In general, the MCS 204 represents the number of useful and parity bits per resource element (RE). Example pre-determined modulation schemes include quadrature phase shift keying (QPSK), 16 quadrature amplitude modulation (16QAM), 64QAM, and 256QAM modulation formats. An example MCS 204 is a 5-bit index that represents a particular modulation scheme, a number of bits per symbol used for modulation, and a target code rate.

The example gNB 200 further includes a target BLER determination module 222 to adapt, by adjusting the target BLER 216, the cellular downlink channel 114 of the cellular communication link 112 to mitigate non-stationary interference caused by devices 108, e.g., Bluetooth devices, in proximity to the UE 104. The target BLER determination module 218 determines the variance of the SINR offset 214, which represents one or more characteristics of the non-stationary interference, and dynamically determines the target BLER 216 used by the link adaptation module 202 or, more specifically, the OLLA module 212 and the ILLA 218 to adapt the MCS 204 for the cellular downlink channel 114, such that the cellular downlink channel 114 adapts to the presence and characteristics of the non-stationary interference. That is, such that an actual BLER converges to the target BLER 216, and the variance of the SINR offset 214 is reduced. The target BLER 216 can be determined by comparing the variance of the SINR offset 214 to one or more thresholds, for example.

In some examples, the target BLER determination module 222 computes the variance of the SINR offset 214 based upon a plurality of past SINR offset values. The plurality of past SINR offset values can be selected using a sliding window, for example.

In some examples, the target BLER determination module 222 selects the target BLER 216 from two or more pre-determined target BLER values using a state machine having two or more states corresponding to the two or more predetermined target BLER values, where transitions between states are based upon comparisons of the variance of the SINR offset 214 to one or more pre-determined thresholds. For example, when the variance of the SINR offset 214 satisfies a first pre-determined threshold of the one or more pre-determined thresholds, the state machine changes from (i) a first state in which the target BLER determination module 222 sets the target BLER to a first pre-determined target BLER value to (ii) a second state in which the target BLER determination module 222 sets the target BLER to a second, larger pre-determined target BLER value. When the variance of the SINR offset 214 satisfies a second pre-determined threshold of the one or more pre-determined thresholds, the state machine can change the state from the second state back to the first state. The first pre-determined threshold is larger than the second pre-determined threshold, in some examples.

Figure 6:
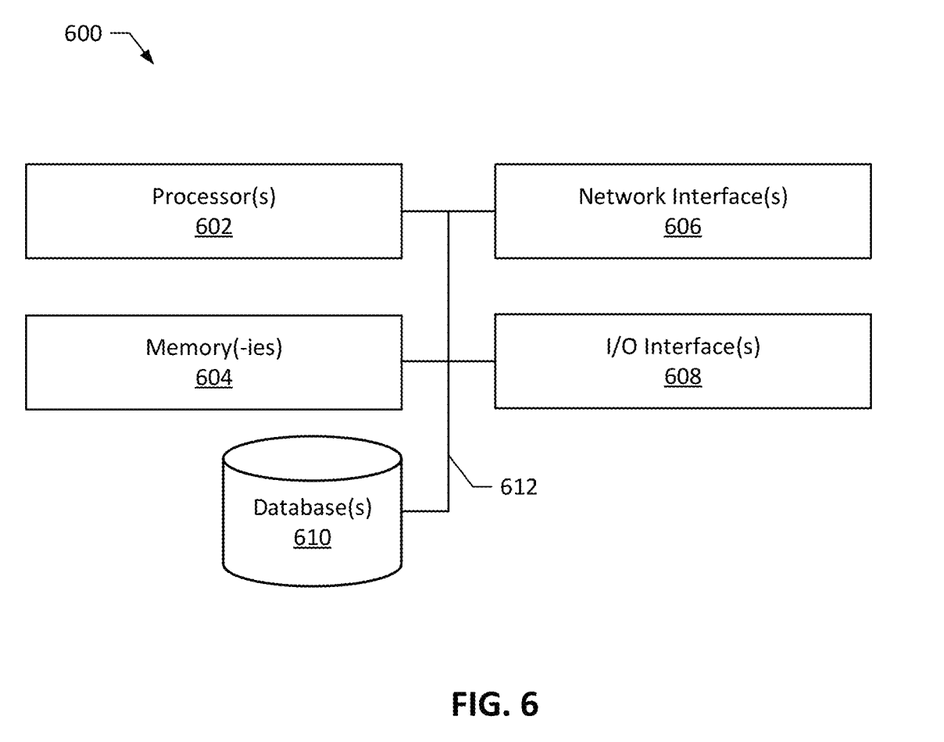
FIG. 6 is a block diagram of an example logic circuit for implementing example systems, methods, and/or operations disclosed herein.

The example modules 208, 212, 218, and 222 can be implemented by one or more sets of computer-readable instructions executed by one or more processors of the gNB 200, such as the processor 602 of FIG. 6. In some examples, the modules 208, 212, 218, and 222 are implemented by different portions of the gNB 200, which may be distributed from each other when a distributed gNB 200 is implemented.

Example Link Adaptation Method

Figure 3:
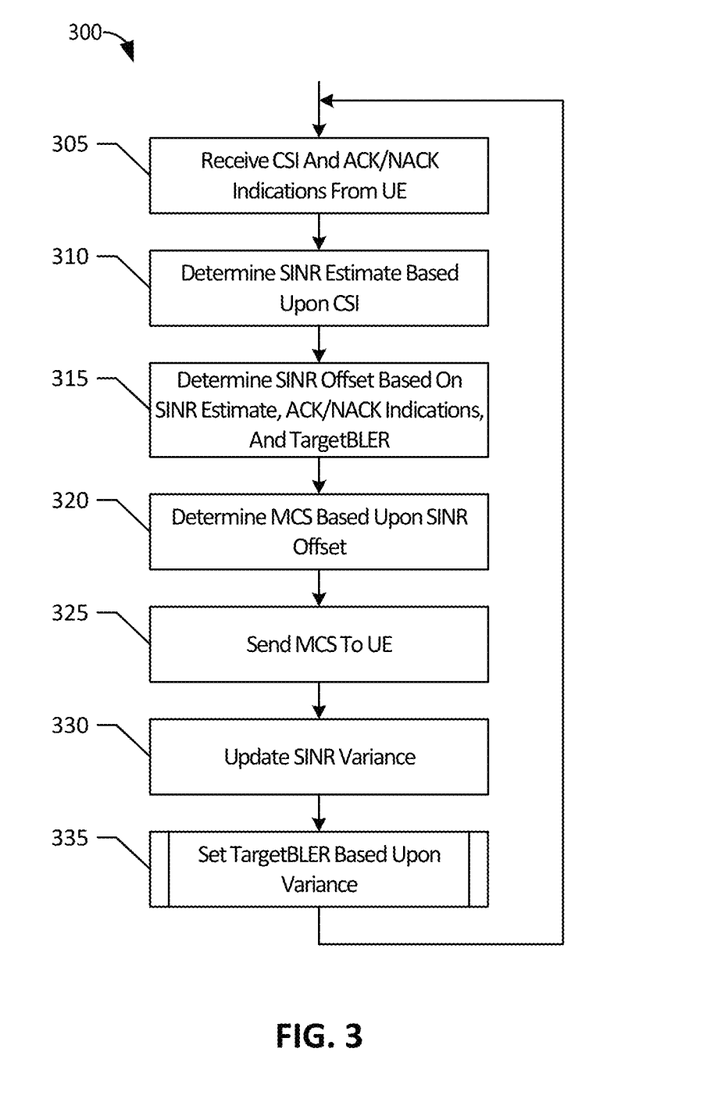
FIG. 3 is a flowchart representative of an example method, hardware logic, machine-readable instructions, or software for implementing the example gNB of FIGS. 1 and 2, in accordance with the disclosure.

FIG. 3 is a flowchart 300 representative of an example method, hardware logic, machine-readable instructions, or software for adapting a 5G cellular downlink channel by selecting a target BLER based upon the variance of an SINR offset, as disclosed herein. Any or all of the blocks of FIG. 3 can be an executable program or portion(s) of an executable program embodied in software and/or machine-readable instructions stored on a non-transitory, machine-readable storage medium for execution by one or more processors such as the processor 602 of FIG. 6. Additionally and/or alternatively, any or all of the blocks of FIG. 3 can be implemented by one or more hardware circuits structured to perform the corresponding operation(s) without executing software or instructions.

The example flowchart 300 starts with a gNB 102, 200 receiving CSI 206 and ACK/NACK indications 220 for a cellular downlink channel 114 from a UE 104 (block 305). The gNB 102, 200 or, more particularly, a CSI handler module 208 determines an estimated SINR 210 based upon the CSI 206 (block 310).

The gNB 102, 200 or, more particularly, an OLLA module 212 can determine an SINR offset 214 based upon the estimated SINR 210, the ACK/NACK indications 220, and a target BLER 216 (block 315).

The gNB 102, 200 or, more particularly, an ILLA module 218 can determine or selects an MCS 204 based upon the estimated SINR 210 and the SINR offset 214 (block 320), and sends the MCS 204 to the UE 104 for the cellular downlink channel 114 (block 325).

The gNB 102, 200 or, more particularly, a target BLER determination module 222 determines or computes the variance of the SINR offset 214 (block 330), and determines or selects a target BLER 216 based upon the variance of the SINR offset 214 (block 335). Control then returns to block 305 to receive additional CSI 206 and ACK/NACK indications 220.

The target BLER determination module 222 can compute the variance of the SINR offset 214 based upon a plurality of past SINR offset values, for example. The plurality of past SINR offset values can be selected, in some examples, using a sliding window.

The target BLER determination module 222 can determine or select the target BLER 216 by comparing the variance of the SINR offset 214 to one or more thresholds, for example. In some examples, the target BLER determination module 222 selects the target BLER 216 from two or more pre-determined target BLER values using a state machine, such as the example state machine 400 of FIG. 4.

Figure 4:
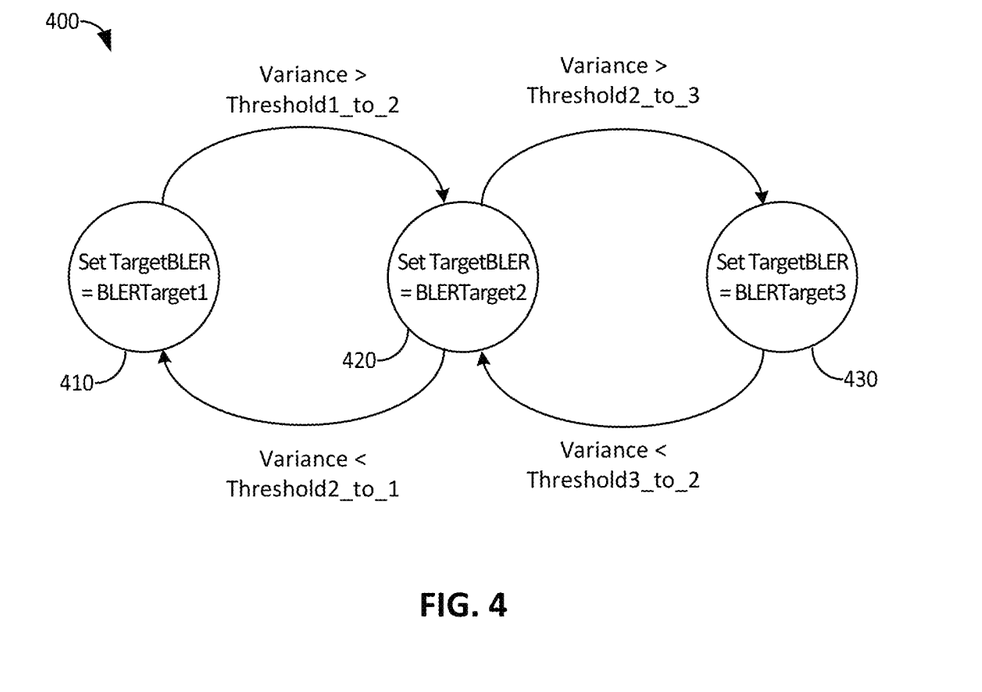
FIG. 4 is a state diagram representative of an example state machine for selecting a target BLER, in accordance with the disclosure.

FIG. 4 is an example state diagram representative of an example state machine 400 for selecting a target BLER 216. The state machine 400 can be used at block 335 of FIG. 3, for example, to select the target BLER 216. All or some of the example state machine 400 can be implemented as an executable program or portion(s) of an executable program embodied in software and/or machine-readable instructions stored on a non-transitory, machine-readable storage medium for execution by one or more processors such as the processor 602 of FIG. 6. Additionally and/or alternatively, all or some of the state machine 400 can be implemented by one or more hardware circuits structured to perform the corresponding operation(s) without executing software or instructions. While the example state machine 400 includes three states, state machines having other numbers of states may be implemented.

In the implementation shown, the state machine 400 has three states 410, 420 and 430 corresponding to three predetermined target BLER values: BLERTarget1, BLERTarget2, and BLERTarget3. Transitions between the states 410, 420 and 430 are based upon comparisons of the variance of the SINR offset 214 to four pre-determined thresholds: Threshold1_to_2, Threshold2_to_3, Threshold2_to_1, and Threshold3_to_2.

Starting in the state 410, the gNB 102, 200 or, more specifically, the target BLER determination module 222 sets the target BLER 216 to BLERTarget1. When the variance of the SINR offset 214 satisfies a first criteria (e.g., greater than Threshold1_to_2), the state machine 400 transitions from the state 410 to the state 420, where the gNB 102, 200 or, more specifically, the target BLER determination module 222 sets the target BLER 216 to BLERTarget2.

At the state 420, when the variance of the SINR offset 214 satisfies a second criteria (e.g., greater than Threshold2_to_3), the state machine 400 transitions from the state 420 to the state 430, where the gNB 102, 200 or, more specifically, the target BLER determination module 222 sets the target BLER 216 to BLERTarget3.

At the state 420, when the variance of the SINR offset 214 satisfies a third criteria (e.g., less than Threshold2_to_1), the state machine 400 transitions from the state 420 to the state 410, where the gNB 102, 200 or, more specifically, the target BLER determination module 222 sets the target BLER 216 to BLERTarget1.

At the state 430, when the variance of the SINR offset 214 satisfies a fourth criteria (e.g., less than Threshold3_to_2), the state machine 400 transitions from the state 430 to the state 420, where the gNB 102, 200 or, more specifically, the target BLER determination module 222 sets the target BLER 216 to BLERTarget2.

Figure 5:
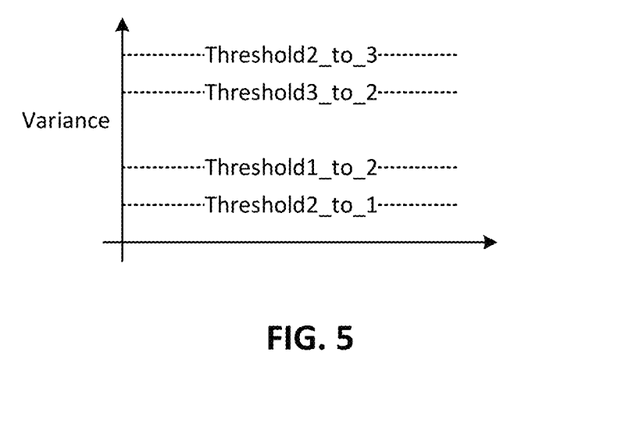
FIG. 5 is a graph showing example relative values for a plurality of thresholds used by the example state machine of FIG. 4.

FIG. 5 is a graph 500 showing example relative values of the thresholds Threshold1_to_2, Threshold2_to_3, Threshold2_to_1, and Threshold3_to_2.

Example Computing System

FIG. 6 is a block diagram representative of an example logic circuit capable of implementing, for example, one or more modules 208, 212, and 218 of the example link adaptation module 202, the target BLER determination module 222 or, more generally, the gnB 102, 200. The example logic circuit of FIG. 6 is a processing platform 600 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 600 of FIG. 6 includes a processor 602 such as, for example, one or more microprocessors, controllers, and/or any suitable type of processor. The example processing platform 600 of FIG. 6 includes memory (e.g., volatile memory, non-volatile memory) 604 accessible by the processor 602 (e.g., via a memory controller). The example processor 602 interacts with the memory 604 to obtain, for example, machine-readable instructions stored in the memory 604 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 600 to provide access to the machine-readable instructions stored thereon.

The example processing platform 600 of FIG. 6 includes one or more communication interfaces such as, for example, one or more network interface 606, and/or one or more input/output (I/O) interfaces 608. The communication interface(s) enable the processing platform 600 of FIG. 6 to communicate with, for example, another device, system (e.g., with the gNB 102, the UE 104, the devices 108, the data center 118, and the server(s) 122) host system, datastore, database, and/or any other machine.

The example processing platform 600 of FIG. 6 includes the network interface(s) 606 to enable communication with other machines via, for example, one or more networks. The example network interface 606 includes any suitable type of communication interface(s) (e.g., wired and/or wireless interfaces) configured to operate in accordance with any suitable communication protocol(s). Example network interfaces 606 include a TCP/IP interface, a WiFi™ transceiver (e.g., according to the IEEE 802.11x family of standards), an Ethernet transceiver, a cellular network radio, a satellite network radio, or any other suitable interface based upon any other suitable communication protocols or standards.

The example, processing platform 600 of FIG. 6 includes the input/output (I/O) interface(s) 608 (e.g., a Bluetooth® interface, a near-field communication (NFC) interface, a universal serial bus (USB) interface, a serial interface, an infrared interface, etc.) to enable receipt of user input (e.g., a touch screen, keyboard, mouse, touch pad, joystick, trackball, microphone, button, etc.) and communication of output data to the user (e.g., via a display, speaker, printer, etc.).

The above description refers to a block diagram of the accompanying drawings. Alternative implementations of the example represented by the block diagram includes one or more additional or alternative elements, processes, and/or devices. Additionally or alternatively, one or more of the example blocks of the diagram may be combined, divided, re-arranged, or omitted. Components represented by the blocks of the diagram are implemented by hardware, software, firmware, and/or any combination of hardware, software, and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged, or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

ADDITIONAL CONSIDERATIONS

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The patent claims at the end of this patent application are not intended to be construed under 35 U.S.C. § 112 (f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. A method, implemented by one or more processors of a cellular base station, the method comprising:
   receiving, from a user equipment (UE) radio, channel state information (CSI) for a cellular downlink channel between the cellular base station and the UE;
   determining a signal to interference and noise ratio (SINR) offset for the cellular downlink channel based upon (i) the CSI and (ii) a target block error rate (BLER);
   detecting a variance of the SINR offset for the cellular downlink channel that represents a presence of non-stationary interference, wherein the non-stationary interference is caused by one or more bursty, frequency-hopping transmissions from a plurality of devices operating within a vicinity of the UE and the one or more bursty, frequency-hopping transmissions occur in a frequency band used for the cellular downlink channel; and
   modifying the target BLER based upon the variance of the SINR offset for the cellular downlink channel such that the cellular downlink channel adapts to the presence of the non-stationary interference.

2. The method of claim 1, wherein modifying the target BLER comprises comparing the variance of the SINR offset to one or more thresholds.

3. The method of claim 1, wherein modifying the target BLER comprises selecting from two or more pre-determined target BLER values using a state machine having two or more states corresponding to the two or more predetermined target BLER values, where transitions between states are based upon comparisons of the variance of the SINR offset to a plurality of pre-determined thresholds.

4. The method of claim 3, wherein selecting from the two or more pre-determined target BLER values comprises:
   when the variance of the SINR offset satisfies a first pre-determined threshold of the plurality of pre-determined thresholds, changing from (i) a first state in which the target BLER is set a first pre-determined target BLER value to (ii) a second state in which the target BLER is set to a second, larger pre-determined target BLER value; and
   when the variance of the SINR offset satisfies a second pre-determined threshold of the plurality of pre-determined thresholds, changing from the second state to the first state.

5. The method of claim 4, wherein the first pre-determined threshold is larger than the second pre-determined threshold.

6. The method of claim 1, wherein the target BLER is modified to reduce the variance of the SINR offset.

7. The method of claim 1, wherein the frequency band is a 2.4 GHz frequency band.

8. The method of claim 1, wherein the plurality of devices and the UE are operating within an aircraft.

9. The method of claim 1, further comprising:
   receiving, from the UE radio, acknowledge/not acknowledge (ACK/NACK) indications for the cellular downlink channel;
   determining an estimated SINR based upon the CSI; and
   determining the SINR offset based upon the estimated SINR, the ACK/NACK indications, and the target BLER.

10. The method of claim 9, further comprising:
    selecting a modulation and coding scheme (MCS) for the cellular downlink channel based upon the SINR offset; and
    sending the selected MCS to the UE radio.

11. The method of claim 1, wherein the cellular base station comprises a fourth generation (4G) base station and/or a fifth generation (5G) base station.

12. A cellular base station, the cellular base station comprising:
    a communication interface configured to receive, from a user equipment (UE) radio, channel state information (CSI) for a cellular downlink channel between the cellular base station and the UE;
    an outer loop link adaptation module configured to determine, using one or more processors, a signal to interference and noise ratio (SINR) offset for the cellular downlink channel based upon (i) the CSI and (ii) a target block error rate (BLER); and
    a target BLER determination module configured to, using the one or more processors:
       detect a variance of the SINR offset for the cellular downlink channel that represents a presence of non-stationary interference, wherein the non-stationary interference is caused by one or more bursty, frequency-hopping transmissions from a plurality of devices operating within a vicinity of the UE and the one or more bursty, frequency-hopping transmissions occur in a frequency band used for the cellular downlink channel, and
       modify the target BLER based upon the variance of the SINR offset for the cellular downlink channel such that the cellular downlink channel adapts to the presence of the non-stationary interference.

13. The cellular base station of claim 12, wherein modifying the target BLER comprises comparing the variance of the SINR offset to one or more thresholds.

14. The cellular base station of claim 12, wherein modifying the target BLER comprises selecting from two or more pre-determined target BLER values using a state machine having two or more states corresponding to the two or more predetermined target BLER values, where transitions between states are based upon comparisons of the variance of the SINR offset to a plurality of pre-determined thresholds.

15. The cellular base station of claim 14, wherein selecting from the two or more pre-determined target BLER values comprises:
    when the variance of the SINR offset satisfies a first pre-determined threshold of the plurality of pre-determined thresholds, changing from (i) a first state in which the target BLER is set a first pre-determined target BLER value to (ii) a second state in which the target BLER is set to a second, larger pre-determined target BLER value; and
    when the variance of the SINR offset satisfies a second pre-determined threshold of the plurality of pre-determined thresholds, changing from the second state to the first state.

16. The cellular base station of claim 15, wherein the first pre-determined threshold is larger than the second pre-determined threshold.

17. The cellular base station of claim 12, wherein the cellular base station comprises a fourth generation (4G) base station and/or a fifth generation (5G) base station.

18. A non-transitory, computer-readable storage medium storing instructions that, when executed by one or more processors, cause a cellular base station to:
    receive, from a user equipment (UE) radio, channel state information (CSI) for a cellular downlink channel between the cellular base station and the UE;

determine a signal to interference and noise ratio (SINR) offset for the cellular downlink channel based upon (i) the CSI and (ii) a target block error rate (BLER);

detect a variance of the SINR offset for the cellular downlink channel that represents a presence of non-stationary interference, wherein the non-stationary interference is caused by one or more bursty, frequency-hopping transmissions from a plurality of devices operating within a vicinity of the UE and the one or more bursty, frequency-hopping transmissions occur in a frequency band used for the cellular downlink channel; and modify the target BLER based upon the variance of the SINR offset for the cellular downlink channel such that the cellular downlink channel adapts to the presence of the non-stationary interference.

19. The storage medium of claim 18, wherein modifying the target BLER comprises comparing the variance of the SINR offset to one or more thresholds.

20. The storage medium of claim 18, wherein modifying the target BLER comprises selecting the target BLER from two or more pre-determined target BLER values using a state machine having two or more states corresponding to the two or more predetermined target BLER values, where transitions between states are based upon comparisons of the variance of the SINR offset to a plurality of pre-determined thresholds.

21. The storage medium of claim 20, wherein selecting from the two or more pre-determined target BLER values comprises:

when the variance of the SINR offset satisfies a first pre-determined threshold of the plurality of pre-determined thresholds, change from (i) a first state in which the target BLER is set a first pre-determined target BLER value to (ii) a second state in which the target BLER is set to a second, larger pre-determined target BLER value; and when the variance of the SINR offset satisfies a second pre-determined threshold of the plurality of pre-determined thresholds, change from the second state to the first state.

22. The storage medium of claim 18, wherein the cellular base station comprises a fourth generation (4G) base station and/or a fifth generation (5G) base station.

* * * * *